United States Patent
Dawson

(10) Patent No.: US 10,771,696 B2
(45) Date of Patent: Sep. 8, 2020

(54) PHYSICALLY BASED CAMERA MOTION COMPENSATION

(71) Applicant: Sony Corporation, Tokyo (JP)

(72) Inventor: Thomas Dawson, Escondido, CA (US)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/200,256

(22) Filed: Nov. 26, 2018

(65) Prior Publication Data

US 2020/0169663 A1    May 28, 2020

(51) Int. Cl.
*H04N 5/232* (2006.01)
*G03B 17/56* (2006.01)

(52) U.S. Cl.
CPC ....... *H04N 5/23258* (2013.01); *G03B 17/561* (2013.01); *H04N 5/2328* (2013.01); *G03B 2205/0007* (2013.01)

(58) Field of Classification Search
CPC ............. H04N 5/23258; H04N 5/2328; G03B 17/561; G03B 2205/0007
USPC ..... 348/208.99, 208.1–208.8, 208.11–208.13
See application file for complete search history.

(56) References Cited

U.S. PATENT DOCUMENTS

| 7,138,747 | B1 | 11/2006 | Smith et al. |
| 7,734,162 | B2* | 6/2010 | Ebato .................. G02B 27/646 348/208.99 |
| 8,058,770 | B2 | 11/2011 | Yamada et al. |
| 2009/0160962 | A1* | 6/2009 | Tabuchi ................. G03B 5/00 348/208.99 |
| 2009/0231450 | A1* | 9/2009 | Tanaka ..................... G03B 5/02 348/208.7 |
| 2013/0021491 | A1* | 1/2013 | Lee ......................... H04N 19/56 348/222.1 |
| 2013/0264908 | A1* | 10/2013 | Matsuo ................. H01L 41/107 310/312 |

FOREIGN PATENT DOCUMENTS

JP             4733657         7/2011

* cited by examiner

*Primary Examiner* — Yogesh K Aggarwal
(74) *Attorney, Agent, or Firm* — Trelllis IP Law Group, PC

(57) ABSTRACT

Implementations generally provide physically based camera motion compensation. In some implementations, a method includes detecting vibrations at an image sensor of a camera. The method further includes determining a vibration signal from the vibrations, wherein the vibration signal includes one or more of a horizontal component and a vertical component. The method further includes sending the vibration signal to one or more actuators, wherein the actuators dampen the vibrations.

18 Claims, 6 Drawing Sheets

100

600

PHYSICALLY BASED CAMERA MOTION COMPENSATION

BACKGROUND

Digital cameras capture and record images using digital technology, which enables users to edit photographs and easily share photographs. Digital cameras include electronic components such as an image sensor to capture incoming light and convert the light into digital values. An image sensor includes an array of photosensitive light collecting or gathering elements that when exposed to light generate a charge pattern corresponding to an optical image. Conventional digital cameras may use image processing software to track the image location on a camera sensor to remove basic camera jitter and to provide a stable image. However, this jitter removal only works within a certain range of motion and frequency of change. Vibrational frequencies higher than 18 KHz are problematic for traditional image compensation schemes.

SUMMARY

Implementations generally provide physically based camera motion compensation. In some implementations, a system includes one or more processors, and includes logic encoded in one or more non-transitory computer-readable storage media for execution by the one or more processors. When executed, the logic is operable to cause the one or more processors to perform operations including: detecting vibrations at an image sensor of a camera; determining a vibration signal from the vibrations, wherein the vibration signal includes one or more of a horizontal component and a vertical component; and sending the vibration signal to one or more actuators, wherein the actuators dampen the vibrations.

With further regard to the system, in some implementations, the vibration signal is within a predetermined frequency range of vibration sensors that detect the vibrations. In some implementations, the vibrations are high-frequency vibrations having a frequency that is above a predetermined frequency threshold. In some implementations, a reaction time of vibration sensors that detect the vibrations is a known value. In some implementations, the logic when executed is further operable to cause the one or more processors to perform operations comprising inverting the vibration signal. In some implementations, the logic when executed is further operable to cause the one or more processors to perform operations comprising phase shifting the vibration signal. In some implementations, the logic when executed is further operable to cause the one or more processors to perform operations comprising adjusting a phase angle of the vibration signal based on a lag between when the vibrations were detected and when the actuators are placed in motion.

In some embodiments, a non-transitory computer-readable storage medium with program instructions thereon is provided. When executed by one or more processors, the instructions are operable to cause the one or more processors to perform operations including: detecting vibrations at an image sensor of a camera; determining a vibration signal from the vibrations, wherein the vibration signal includes one or more of a horizontal component and a vertical component; and sending the vibration signal to one or more actuators, wherein the actuators dampen the vibrations.

With further regard to the computer-readable storage medium, in some implementations, the vibration signal is within a predetermined frequency range of vibration sensors that detect the vibrations. In some implementations, the vibrations are high-frequency vibrations having a frequency that is above a predetermined frequency threshold. In some implementations, a reaction time of vibration sensors that detect the vibrations is a known value. In some implementations, the instructions when executed are further operable to cause the one or more processors to perform operations comprising inverting the vibration signal. In some implementations, the instructions when executed are further operable to cause the one or more processors to perform operations comprising phase shifting the vibration signal. In some implementations, the instructions when executed are further operable to cause the one or more processors to perform operations comprising adjusting a phase angle of the vibration signal based on a lag between when the vibrations were detected and when the actuators are placed in motion.

In some implementations, a method includes: detecting vibrations at an image sensor of a camera; determining a vibration signal from the vibrations, wherein the vibration signal includes one or more of a horizontal component and a vertical component; and sending the vibration signal to one or more actuators, wherein the actuators dampen the vibrations.

With further regard to the method, in some implementations, the vibration signal is within a predetermined frequency range of vibration sensors that detect the vibrations. In some implementations, the vibrations are high-frequency vibrations having a frequency that is above a predetermined frequency threshold. In some implementations, a reaction time of vibration sensors that detect the vibrations is a known value. In some implementations, the method further includes inverting the vibration signal. In some implementations, the method further includes phase shifting the vibration signal.

A further understanding of the nature and the advantages of particular implementations disclosed herein may be realized by reference of the remaining portions of the specification and the attached drawings.

DETAILED DESCRIPTION

Implementations described herein provide physically based camera motion compensation. As described in more detail herein, implementations use physical motion of actuators to compensate for high-speed vibrations that affect the clarity of images captured by an image sensor of a camera.

In various implementations, a camera damping system includes vibration sensors that detect high-frequency vibrations at an image sensor of the camera. The system determines a vibration signal from the vibrations, where the vibration signal includes a horizontal component and/or a vertical component. The system then sends the vibration signal to one or more actuators, where the actuators dampen the vibrations. The motion compensation assists the camera in producing the best possible pictures.

Figure 1:
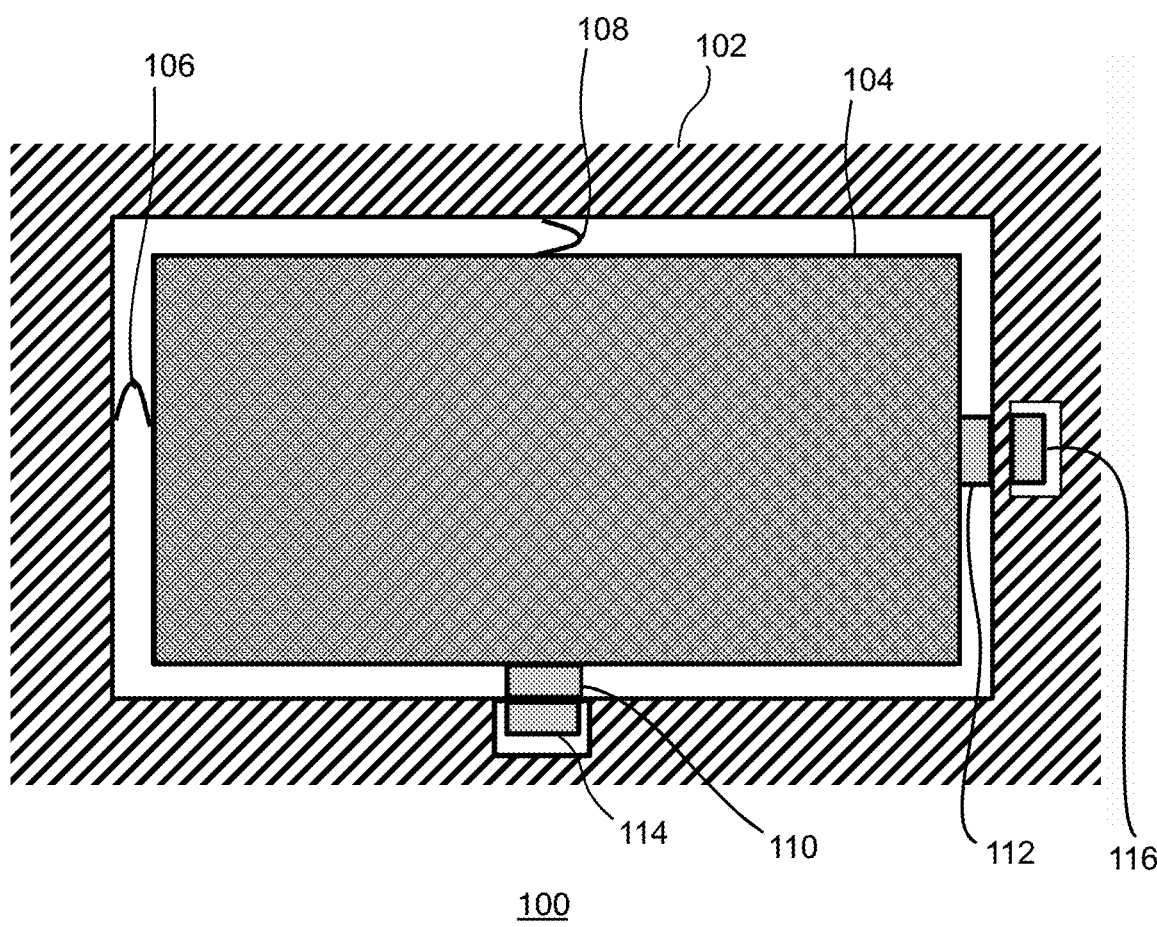
FIG. 1 illustrates a front view of a camera assembly, including an image sensor, according to some implementations.

FIG. 1 illustrates a front view of a camera assembly 100, including an image sensor, according to some implementations. As shown, camera assembly 100 includes a camera support frame 102 and an image sensor 104 mounted in camera support frame 102 and connected to camera support frame 102 by tunable torsion springs 106 and 108 and piezoelectric actuators 110 and 112. In some embodiments, several more tunable torsion springs may be positioned around image sensor 100 for additional stability and support.

In some embodiments, counter weight actuators 114 and 116 assist with camera stability and smooth sensor movement. Embodiments directed to operations of piezoelectric actuators 110 and 112 and actuated counter weights 114 and 116 are described in more detail herein, for example, in connection with FIG. 3.

In various embodiments, the speed of piezoelectric actuators 110 and 112 enables them to support image compensation while a stacked structure (e.g., FIG. 3) enables the amplitude of the actuators to match the size of the vibrations that need to be dampened. In various scenarios, piezoelectric systems such as piezoelectric speakers can handle frequencies well above 20 KHz. A high-speed camera shutter may run at 1 KHz (one thousandth of a second), for example.

In other implementations, image sensor 100 may not have all of the components shown and/or may have other elements including other types of elements instead of, or in addition to, those shown herein.

Figure 2:
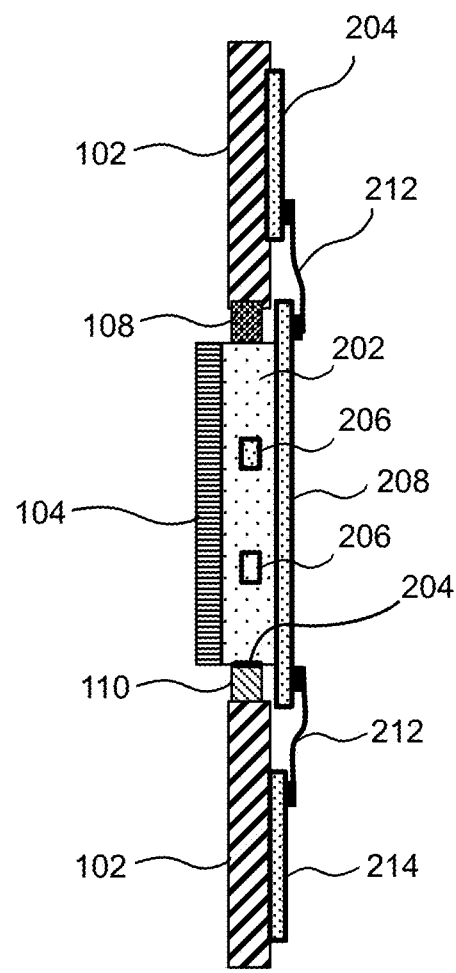
FIG. 2 illustrates a side-view cutaway view of the camera assembly of FIG. 1, including the image sensor mounted in a frame, and electronics mounted on the back of the image sensor, according to some implementations.

FIG. 2 illustrates a side-view cutaway view of the camera assembly 100 of FIG. 1, including the image sensor 104 mounted in a frame, and electronics mounted on the back of the image sensor, according to some implementations. As shown, camera support frame 102 connects to a sensor support module 202 through both the torsion springs such as torsion spring 108 and the piezoelectric actuators such as piezoelectric actuator 110. In various embodiments, sensor support module 202 may include electronics to process values from the light collecting elements in order to produce pixel data from image sensor 104. In other embodiments, pixel data produced within the sensor package itself is processed by the camera electronics module. A connection 204 between sensor support module 202 and the piezoelectric actuator 110 may include the electrical connections needed to control the piezoelectric actuator 110 from sensor support module 202.

In various implementations, sensor support module 202 includes one or more vibration sensors 206 to detect vibrations of the camera and more specifically image sensor 104. The number of vibration sensors and their positions may vary, depending on the particular implementation. As described in more detail herein, vibration sensors 206 control of the motion of piezoelectric actuators 110 and 112 (actuator 112 is shown in FIG. 1 but not shown in FIG. 2) based on the detected vibrations in order to stabilize image sensor 104. As such, camera assembly 100 provides a damping system that reduces or eliminates the vibrations of image sensor 104, thereby improving the quality of captured images.

While image sensor 104 is stabilized, camera sensor electronics 208 collect the data for each individual light collecting element from sensor support module 202. This data may be passed to other processing and storage elements within the camera via flexible cable connections 212.

In other implementations, image sensor 100 may not have all of the components shown and/or may have other elements including other types of elements instead of, or in addition to, those shown herein.

Figure 3:
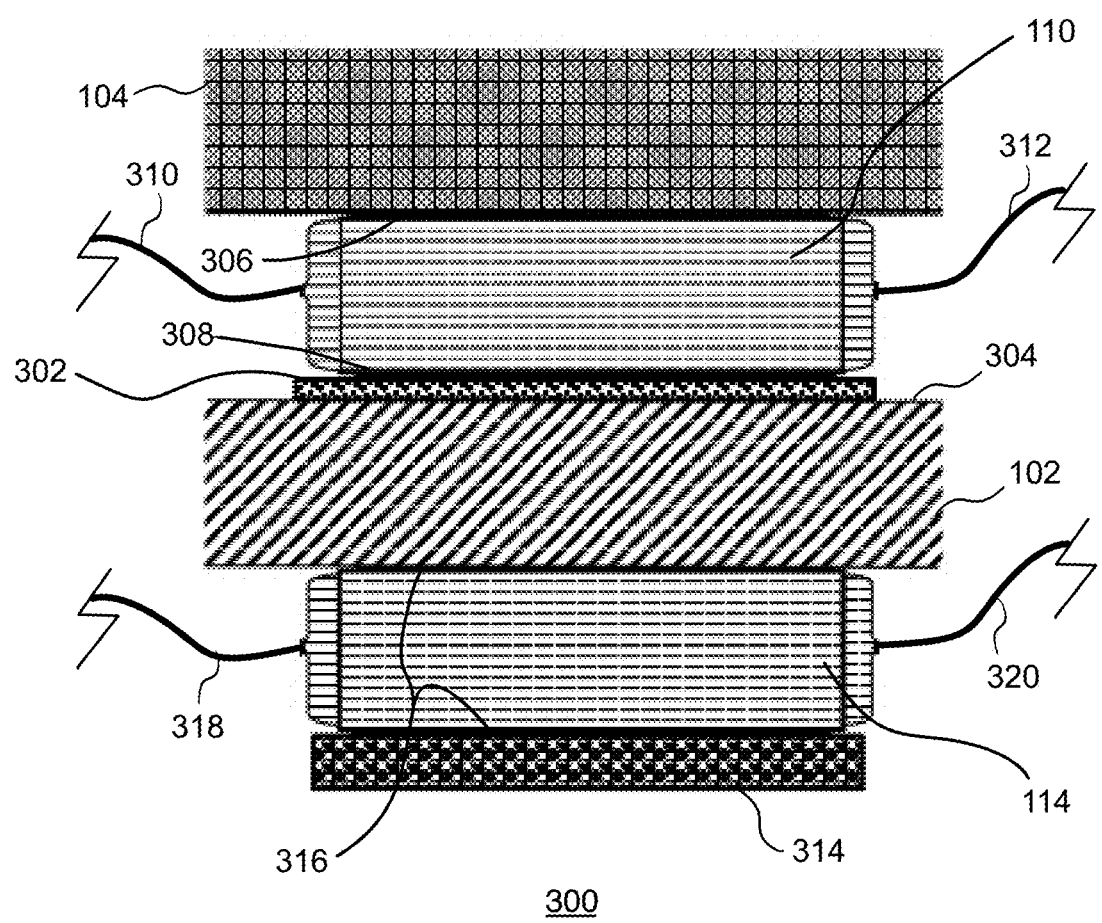
FIG. 3 illustrates a piezoelectric sensor actuator arrangement that includes an actuated counter weight, according to some implementations.

FIG. 3 illustrates a piezoelectric sensor actuator arrangement 300 that includes an actuated counter weight, according to some implementations. An example vertical sensor actuator arrangement configuration is shown. A horizontal sensor actuator arrangement is the same, yet rotated 90 degrees.

Shown is a piezoelectric actuator 110. In various embodiments, a strong adhesive or metal soldering bonds piezoelectric actuator 110 to sensor array 104 and a slider plate 302. Slider plate 302 allows piezoelectric actuator 110 to move in response to motion from the horizontal actuator. A polished smooth surface 304 is substantially friction free and allows piezoelectric actuator 110 to move along the camera support frame 102. In various embodiments, slider plates 306 and 308 may be composed of metal, ceramic or plastic. In various implementations, slider plates 306 and 308 may represent either adhesive or a solder based connection of the piezoelectric stack to the frame and the slider plate. Slider plates 306 and 308 may be rigid and sturdy connections that may be but are not limited to adhesive, soldering, or mechanical. Cabling attachments 310 and 312 connect the actuator to the control electronics of the camera.

Piezoelectric actuator 110 is composed of many layers of piezoelectric elements. As such, piezoelectric actuator 110 may also referred to as a sensor actuator stack. In various embodiments, some number or all of the layers may be activated in a set sequence or at the same time depending on the camera mode settings.

In various embodiments, counter weight actuator 114, also referred to as counter weight actuator stack 114, moves in the opposite direction of piezoelectric actuator 110. For example, when piezoelectric actuator 110 is moving up, counter weight actuator 114 is moving down. When piezoelectric actuator 110 is moving down, counter weight actuator 114 is moving up. A counter weight actuator 314 may be of any rigid material whose weight is enough to counter balance the motion imparted to sensor array 104. A strong adhesive or metal soldering 316 attaches counter weight actuator 114 to camera support frame 102 and the counter weight 314. In some implementations, counter weight actuator 114 (piezoelectric stack) has very little weight (mass) itself and needs the counter weight (additional mass) to balance the motion of the sensor. Cabling attachments 318 and 320 connect counter weight actuator to the control electronics of the camera.

In other implementations, piezoelectric sensor actuator arrangement 300 may not have all of the components shown and/or may have other elements including other types of elements instead of, or in addition to, those shown herein.

Figure 4:
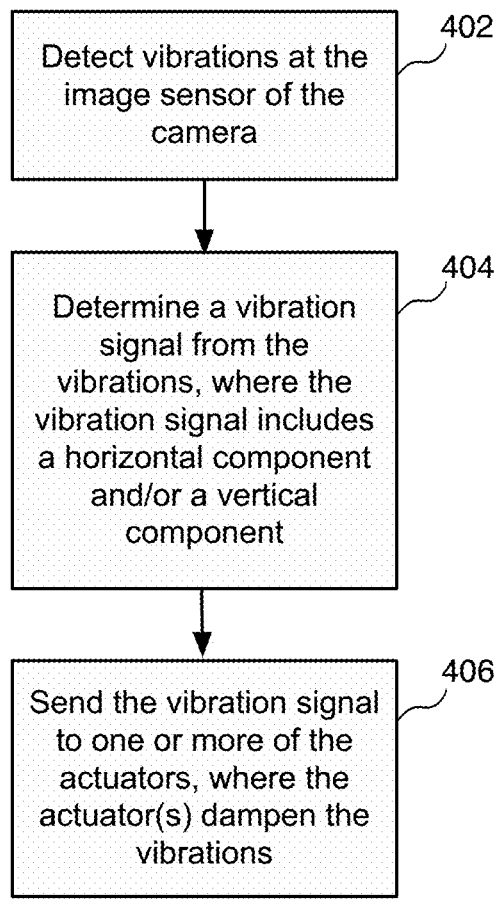
FIG. 4 illustrates an example flow diagram for providing physically based camera motion compensation, according to some implementations.

FIG. 4 illustrates an example flow diagram for providing physically based camera motion compensation, according to some implementations. In various implementations, referring to both FIGS. 1, 2, and 4, a method is initiated at block 402, where vibration sensors 206 of the damping system detect vibrations at image sensor 104 of the camera.

At block 404, the system determines a vibration signal from the vibrations, where the vibration signal includes a horizontal component and/or a vertical component.

In various implementations, the vibration signal is within a predetermined frequency range of vibration sensors 206 that detect the vibrations. An example frequency range may be above 18 KHz and below 100 KHz. Other frequency ranges are possible and may vary, depending on the particular implementation. In various implementations, the system may ignore lower frequencies below the frequency range, because such lower frequencies (e.g., bigger camera movements) are likely intentional. The system may ignore vibrations below the frequency range, as such frequencies (e.g., 17 or 18 kilohertz, etc.) may not affect images to a degree that that is detectable to the human eye. Vibrational frequencies within the frequency range may represent normal vibrations that occur even while the user is attempting to hold the camera still when taking pictures.

In various implementations, the vibrations are high-frequency vibrations having a frequency that is above a predetermined frequency threshold. A predetermined lower frequency threshold may be 17 or 18 kilohertz, for example. In some implementations, sound frequencies below the threshold are ignored.

In various implementations, the reaction time of vibration sensors 206, which that detect the vibrations, is a known value. This enables the system to generate a vibration signal from the vibrations. Vibration sensors 206 detect high frequencies higher than 18 KHz. As such, vibration sensors 206 detect tiny, high-frequency vibrations coming into the camera, filter out the lower frequency vibrations, and hold image sensor 104 still in light of the high frequency vibrations.

As indicated above, the vibration signal includes a horizontal component, a vertical component, or both horizontal and vertical components, depending on the vibrations. Distinguishing between vertical and horizontal components facilitates in fine tuning the vibration compensation in either or both vertical and horizontal directions, which is described in more detail below.

In some implementations, the system inverts the vibration signal. In some implementations, the system phase shifts the vibration signal. In some implementations, the system both inverts and phase shifts the vibration signal. For example, the system may invert and slightly phase shift the vibration signal to account for inherent lag times. Example implementations are described in more detail below.

At block 406, the system sends the vibration signal to one or more of actuator 110 and 112, where actuator 110 and/or actuator 112 dampen the vibrations. In various embodiments, the vibration signal causes actuators 110 and 112 to move at high speed in order to support image compensation and positively affect image clarity. The stacked structure enables the amplitude of the actuators to match the size of the vibrations that need to be dampened. As indicated herein, the system moves the counter weights in the opposite direction from the actuators.

As indicated above, the system distinguishes between vertical and horizontal components of the vibration signal. This enables precise vibration compensation in either or both vertical and horizontal directions. As indicated above, in some implementations, the system inverts the vibration signal and sends the inverted signal to actuators 110 and 112. In various implementations, the system inverts the vibration signal or phase shifts the vibration signal by substantially 180 degrees. This causes actuators 110 and 112 to replicate the original vibrations but offset by 180 degrees, resulting in actuators 110 and 112 moving in the opposite direction from vibration movement of image sensor 104. The following example scenarios illustrate how the actuators reduce or eliminate the frequencies of the vibration, which in turn improve the quality of the camera images.

In an example scenario with only vertical vibrations, when image sensor 104 is moving upward, the inverted signal causes actuator 110 to move downward. Conversely, when image sensor 104 is moving downward, the inverted signal causes actuator 110 to move upward. Because there is only a vertical component in this example, horizontal actuator 112 does not affect the compensation movement.

In an example scenario with only horizontal vibrations, when image sensor 104 is moving to the left, the inverted signal causes actuator 112 to move to the right. Conversely, when image sensor 104 is moving to the right, the inverted signal causes actuator 112 to move to the left. Because there is only a horizontal component in this example, vertical actuator 110 does not affect the compensation movement.

In yet another example scenario, where the vibration signal has both vertical and horizontal components, both vertical actuator 110 and horizontal actuator 112 contribute to compensate for the vibrations. For example, when image sensor 104 is moving upward, the inverted signal causes actuator 110 to move downward. When image sensor 104 is moving downward, the inverted signal causes actuator 110 to move upward. In the horizontal directions, when image sensor 104 is moving to the left, the inverted signal causes actuator 112 to move to the right. When image sensor 104 is moving to the right, the inverted signal causes actuator 112 to move to the left.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 5:
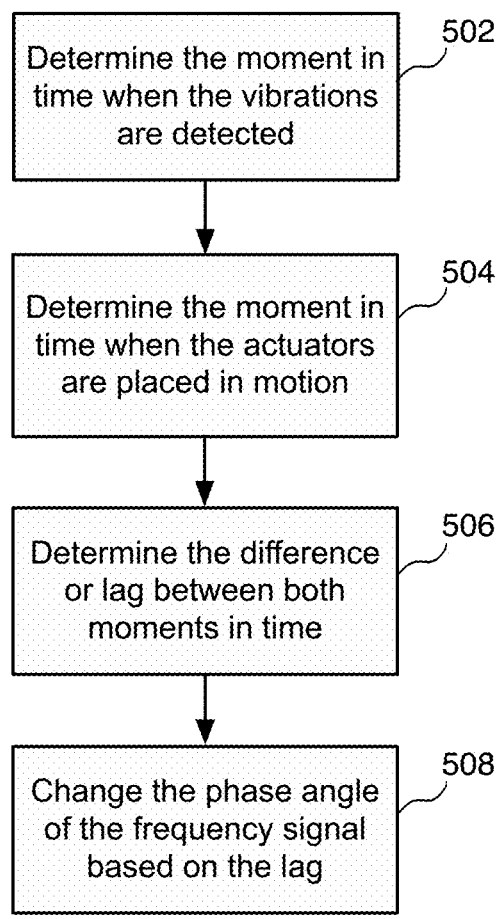
FIG. 5 illustrates an example flow diagram for adjusting the phase angle of a vibration signal, according to some implementations.

FIG. 5 illustrates an example flow diagram for adjusting the phase angle of a vibration signal, according to some implementations. In the following example implementations, the system may both invert and slightly phase shift the vibration signal to account for inherent lag times. The system adjusts the phase angle of the vibration signal based on a lag between when the vibrations were detected and when the actuators are placed in motion. In various implementations, a method is initiated at block 502, where the system determines the moment in time when the vibrations are detected.

At block 504, the system determines the moment in time when the actuators are placed in motion.

At block 506, the system determines the difference or lag between both moments in time, which is the lag between when the vibration is detected and when the actuators are placed in motion.

At block 508, the system changes the phase angle of the frequency signal based on the lag.

In various implementations, by accounting for the lag between when the vibration is detected and when the actuators are placed in motion, the system controls and adjusts the phase angle thereby reducing the vibration frequencies. In some implementations, if the vibration being measured matches the vibration signal sent to the actuators, the system turns off the actuators.

Embodiments described herein provide various benefits. For example, embodiments compensate for vibrations of the camera and more specifically vibrations of the image sensor. They provide higher quality images captured by the image sensor. Implementations address an area of motion stabilization where conventional systems have difficulty handling high-speed vibrations. Current methods do not address the handling of image stabilization for interfering frequencies above 18 KHz.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 6:
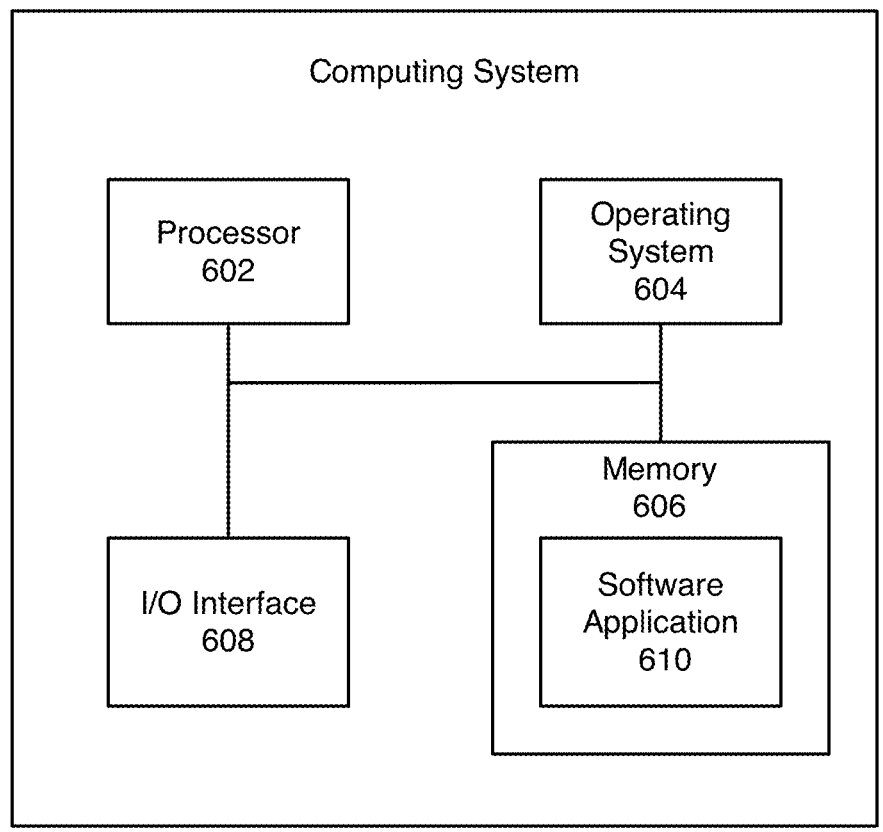
FIG. 6 illustrates a block diagram of an example computing system, which may be used for some implementations described herein.

FIG. 6 illustrates a block diagram of an example computing system 600, which may be used for some implementations described herein. In some implementations, computing system 600 may include a processor 602, an operating system 604, a memory 606, and an input/output (I/O) interface 608. In various implementations, processor 602 may be used to implement various functions and features described herein, as well as to perform the method implementations described herein. While processor 602 is described as performing implementations described herein, any suitable component or combination of components of computing system 600 or any suitable processor or processors associated with computing system 600 or any suitable system may perform the steps described. Implementations described herein may be carried out on a user device, on a server, or a combination of both.

Computing system 600 also includes a software application 610, which may be stored on memory 606 or on any other suitable storage location or computer-readable medium. Software application 610 provides instructions that enable processor 602 to perform the implementations described herein and other functions. Software application may also include an engine such as a network engine for performing various functions associated with one or more networks and network communications. The components of computing system 600 may be implemented by one or more processors or any combination of hardware devices, as well as any combination of hardware, software, firmware, etc.

For ease of illustration, FIG. 6 shows one block for each of processor 602, operating system 604, memory 606, I/O interface 608, and software application 610. These blocks 602, 604, 606, 608, and 610 may represent multiple processors, operating systems, memories, I/O interfaces, and software applications. In various implementations, computing system 600 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise.

Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:
one or more processors; and
logic encoded in one or more non-transitory computer-readable storage media for execution by the one or more processors and when executed operable to cause the one or more processors to perform operations comprising:
detecting vibrations at an image sensor of a camera;
determining a vibration signal from the vibrations, wherein the vibration signal includes one or more of a horizontal component and a vertical component;
adjusting a phase angle of the vibration signal based on a lag between when the vibrations were detected and when one or more actuators are placed in motion; and
sending the vibration signal to the one or more actuators, wherein the actuators dampen the vibrations.

2. The system of claim 1, wherein the vibration signal is within a predetermined frequency range of vibration sensors that detect the vibrations.

3. The system of claim 1, wherein the vibrations are high-frequency vibrations having a frequency that is above a predetermined frequency threshold.

4. The system of claim 1, wherein a reaction time of vibration sensors that detect the vibrations is a known value.

5. The system of claim 1, wherein the logic when executed is further operable to cause the one or more processors to perform operations comprising inverting the vibration signal.

6. The system of claim 1, wherein the logic when executed is further operable to cause the one or more processors to perform operations comprising phase shifting the vibration signal.

7. A non-transitory computer-readable storage medium with program instructions stored thereon, the program instructions when executed by one or more processors are operable to cause the one or more processors to perform operations comprising:
detecting vibrations at an image sensor of a camera;
determining a vibration signal from the vibrations, wherein the vibration signal includes one or more of a horizontal component and a vertical component;
adjusting a phase angle of the vibration signal based on a lag between when the vibrations were detected and when one or more actuators are placed in motion; and
sending the vibration signal to the one or more actuators, wherein the actuators dampen the vibrations.

8. The computer-readable storage medium of claim 7, wherein the vibration signal is within a predetermined frequency range of vibration sensors that detect the vibrations.

9. The computer-readable storage medium of claim 7, wherein the vibrations are high-frequency vibrations having a frequency that is above a predetermined frequency threshold.

10. The computer-readable storage medium of claim 7, wherein a reaction time of vibration sensors that detect the vibrations is a known value.

11. The computer-readable storage medium of claim 7, wherein the instructions when executed are further operable to cause the one or more processors to perform operations comprising inverting the vibration signal.

12. The computer-readable storage medium of claim 7, wherein the instructions when executed are further operable to cause the one or more processors to perform operations comprising phase shifting the vibration signal.

13. A computer-implemented method comprising:
detecting vibrations at an image sensor of a camera;
determining a vibration signal from the vibrations, wherein the vibration signal includes one or more of a horizontal component and a vertical component;
adjusting a phase angle of the vibration signal based on a lag between when the vibrations were detected and when one or more actuators are placed in motion; and
sending the vibration signal to the one or more actuators, wherein the actuators dampen the vibrations.

14. The method of claim 13, wherein the vibration signal is within a predetermined frequency range of vibration sensors that detect the vibrations.

15. The method of claim 13, wherein the vibrations are high-frequency vibrations having a frequency that is above a predetermined frequency threshold.

16. The method of claim 13, wherein a reaction time of vibration sensors that detect the vibrations is a known value.

17. The method of claim 13, further comprising inverting the vibration signal.

18. The method of claim 13, further comprising phase shifting the vibration signal.

* * * * *